(12) United States Patent
Petak et al.

(10) Patent No.: US 6,653,566 B2
(45) Date of Patent: Nov. 25, 2003

(54) COVERS FOR OUTLET BOXES

(75) Inventors: Randy Petak, Pico Rivera, CA (US); Jeffrey Shaw, San Dimas, CA (US)

(73) Assignee: PW Industries, Inc., Pico Rivera, CA (US)

( * ) Notice: Subject to any disclaimer, the term of this patent is extended or adjusted under 35 U.S.C. 154(b) by 0 days.

(21) Appl. No.: 10/058,893

(22) Filed: Jan. 28, 2002

(65) Prior Publication Data

US 2003/0141092 A1 Jul. 31, 2003

(51) Int. Cl.$^7$ .................................................. H02G 3/14
(52) U.S. Cl. ......................... 174/66; 174/67; 220/241; 220/242
(58) Field of Search ........................ 174/66, 67, 135; 220/241, 242, 37; 439/135, 136; D13/177; D8/353

(56) References Cited

U.S. PATENT DOCUMENTS

| | | | |
|---|---|---|---|
| 1,604,237 A | * 10/1926 | Platt | 174/53 X |
| 3,059,803 A | * 10/1962 | Holsinger | 174/50 X |
| 3,601,276 A | 8/1971 | Culpepper | |
| 3,745,664 A | 7/1973 | Altseimer | |
| 3,859,454 A | 1/1975 | Mann | |
| 4,194,644 A | 3/1980 | Narvaez | |
| 4,541,538 A | 9/1985 | Swetnam | |
| 4,603,932 A | 8/1986 | Heverly | |
| 4,810,833 A | 3/1989 | Meyers | |
| 4,907,711 A | 3/1990 | Stucklik, III | |
| 4,918,259 A | 4/1990 | Hanson | |
| 4,953,733 A | 9/1990 | Loscuito | |
| 4,979,633 A | 12/1990 | Lakey | |
| 5,003,128 A | 3/1991 | Grondin | |
| 5,041,698 A | 8/1991 | Takagi et al. | |
| 5,044,987 A | 9/1991 | Tihanyi | |
| 5,063,872 A | 11/1991 | Maus et al. | |
| 5,077,452 A | * 12/1991 | Mathers et al. | 174/66 X |
| 5,087,796 A | 2/1992 | Norman | |
| 5,195,901 A | 3/1993 | Correnti | |
| 5,301,437 A | 4/1994 | Burke | |
| 5,359,152 A | 10/1994 | Hone-Lin | |
| 5,389,740 A | 2/1995 | Austin | |
| 5,432,298 A | 7/1995 | Thompson | |
| 5,526,952 A | 6/1996 | Green | |
| 5,562,222 A | * 10/1996 | Jordan et al. | 220/3.8 |
| 5,639,991 A | 6/1997 | Schuette | |
| 5,711,082 A | 1/1998 | Olivo | |
| 5,723,816 A | 3/1998 | Neece | |
| 5,731,544 A | 3/1998 | Burck et al. | |
| 5,902,960 A | 5/1999 | Smith | |
| 5,912,432 A | 6/1999 | Thomas | |
| 6,103,974 A | 8/2000 | Erdfarb | |
| 6,166,329 A | 12/2000 | Oliver et al. | |
| 6,179,634 B1 | 1/2001 | Hull et al. | |
| 6,317,995 B1 | 11/2001 | Hoffmann, Sr. | |
| 6,403,883 B1 | 6/2002 | Morgan et al. | |
| 6,418,036 B1 | 7/2002 | Rodrigues | |

* cited by examiner

*Primary Examiner*—Dhiru R Patel
(74) *Attorney, Agent, or Firm*—Christie, Parker & Hale, LLP

(57) ABSTRACT

A cover for pre-wired conduit boxes for use in installing sheet wall material around the conduit boxes, with or without mud rings having an opening and side walls, the conduit boxes having a front opening and spaced side walls and a back wall that define a cavity therein, and with fixtures and wiring contained therein. The cover is made from a puncture and ablation resistant material, such as steel, and has a face plate with a perimeter edge and apertures formed therethrough. The cover is sized to cover the front opening of the conduit box or the mud ring, and has arms extended rearwardly therefrom which are adapted to snugly engage with side walls of the conduit box of mud ring. The cover is preferable a unitary structure, and when the cover is placed over the front opening of the outlet box or mud ring, the perimeter of the cover provides a guide for a cutting tool, such as a router, which will allow a user to cut out an opening through the sheet material to complete installation of the wall sheet material. The cover is easily removable after the sheet wall material is installed and desired wall treatment (e.g. painting, wallpapering, etc.) is completed. The outlet boxes can be pre-wired with fixtures and wiring.

20 Claims, 9 Drawing Sheets

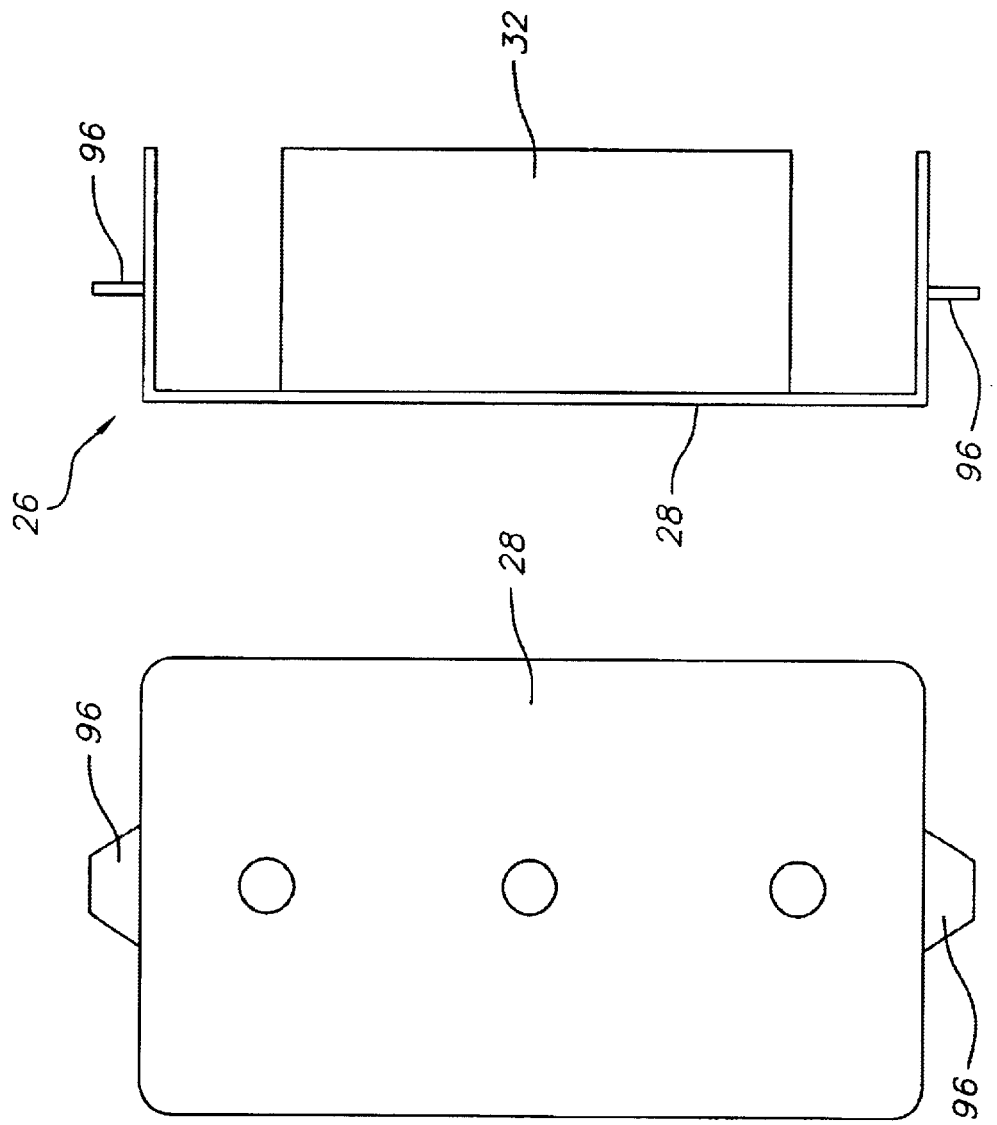

COVERS FOR OUTLET BOXES

BACKGROUND OF THE INVENTION

A cover for outlet boxes, and more particularly pre-wired electrical wiring system including a cover permitting installation of wall sheet material over the pre-wired outlet box, after which an opening in the wall sheet material can be made in situ to expose the outlet boxes.

In commercial construction applications, the trend is towards pre-fabrication of various systems to lower labor cost, and increase productivity, and speed up the construction process. Pre-wired electrical systems, wherein wiring, plugs and switches are pre-wired into outlet boxes, are gaining popularity. These pre-wired outlet boxes are installed in commercial structures, in particular to metal or wood studs. After the conduit and outlet boxes are installed, the studs are normally covered with wall covering materials such as drywall, fiber board, masonry board, a composite sheet material, and the like. In the application of the sheet material, installers frequently use a router with a small cutting tip to expose openings for outlets by loosely hanging the sheet material in place, punching the router through in the general vicinity of the outlet box, and then routing around the outer perimeter of the outlet box to define an opening in the sheet material. In such a way, the sheet material can be loosely installed through a few points to the studs (e.g. with screws), and then the cutouts for the outlet box can be formed in the sheet material with a router, and thereafter, the sheet material can be completely mounted.

A shortcoming of using a router is that if the outlet box is pre-wired and includes switches, electrical outlets and other devices, sometimes the router can cause damage to the switch and the wiring contained therein, thereby requiring removal of the sheet material and replacement of the pre-wired outlet box.

It is known to use plastic covers to protect switches and outlets from being painted over during painting and other wall treatment, and there are covers which are used to mark the inside surface of the sheet material during installation of the sheet material. However, there remains a need for outlet covers which are adopted to permit use of routers to cut out openings in sheet material during installation of sheet material over pre-wired outlet boxes.

SUMMARY OF THE INVENTION

The invention provides an outlet box cover having a face plate which covers an open face of an outlet box and/or a mud ring affixed thereto. Arms extend from edges of the face plate and the arms are adopted to engage the sides of the outlet box. The outlet box cover is formed of material (e.g. steel) which can not be easily penetrated or damaged by a router, thereby protecting switches, outlets, jacks and wiring contained in a pre-wired outlet box. The cover is likewise useful to cover outlet boxes that are not pre-wired as well, to prevent materials from entering the outlet box. The covers can preferably be provided to the end user also attached to the pre-wired outlet boxes, or can be installed thereafter. After the sheet material is installed, the covers can be easily removed and either discarded, re-used, or recycled. Preferably, the plurality of apertures are formed in the outlet box cover to allow the outlet cover to be easily removed (e.g., with needle-nose pliers, and the like).

BRIEF DESCRIPTION OF THE DRAWINGS

FIG. 13 is a top plan view showing the outlet cover of FIG. 12.

FIG. 14 is a side view showing the outlet cover of FIG. 12.

DETAILED DESCRIPTION OF EMBODIMENTS OF THE INVENTION

Figure 1:
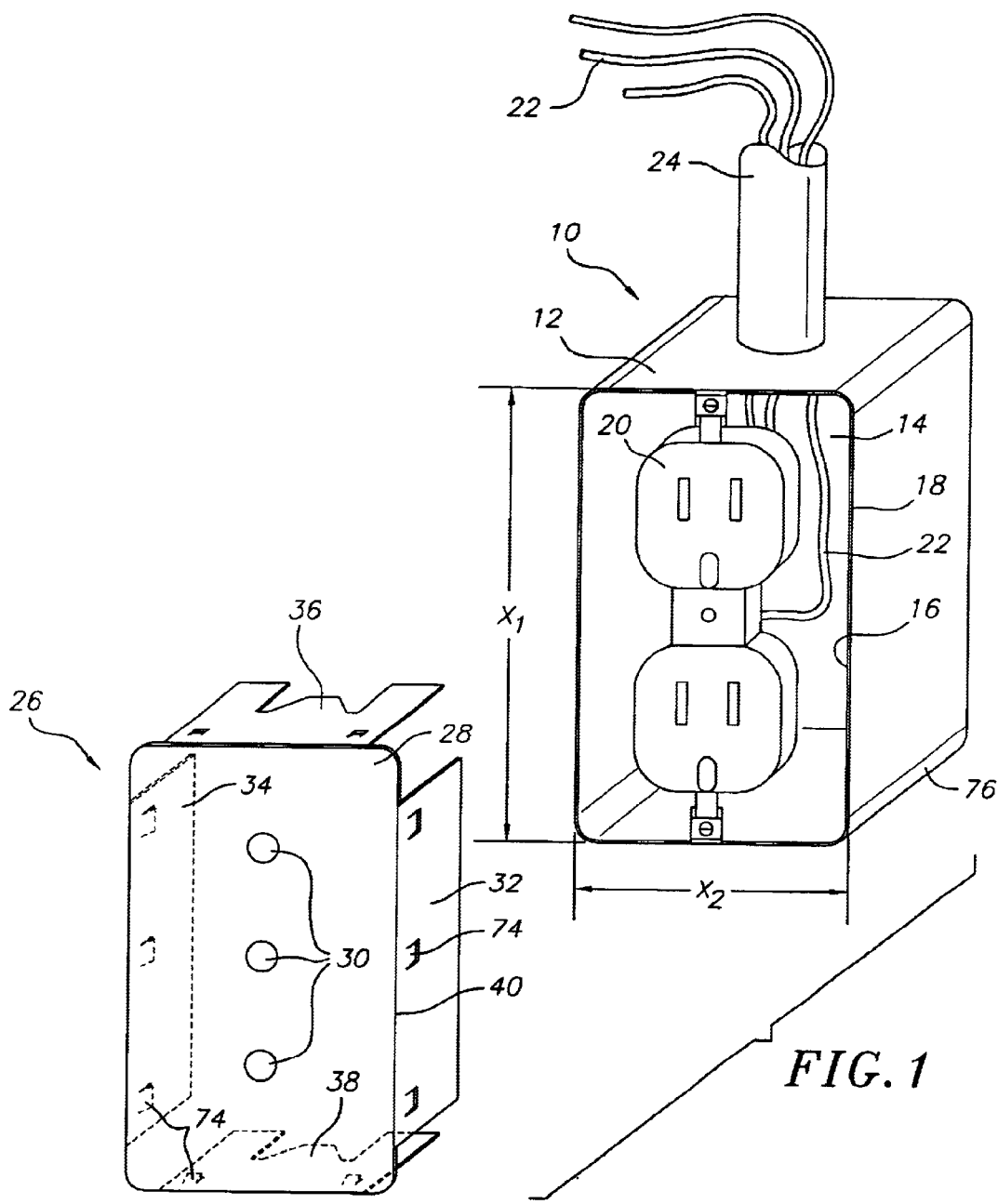
FIG. 1 is a perspective view of a pre-wired outlet box with the cover therefor removed.
Figure 9:
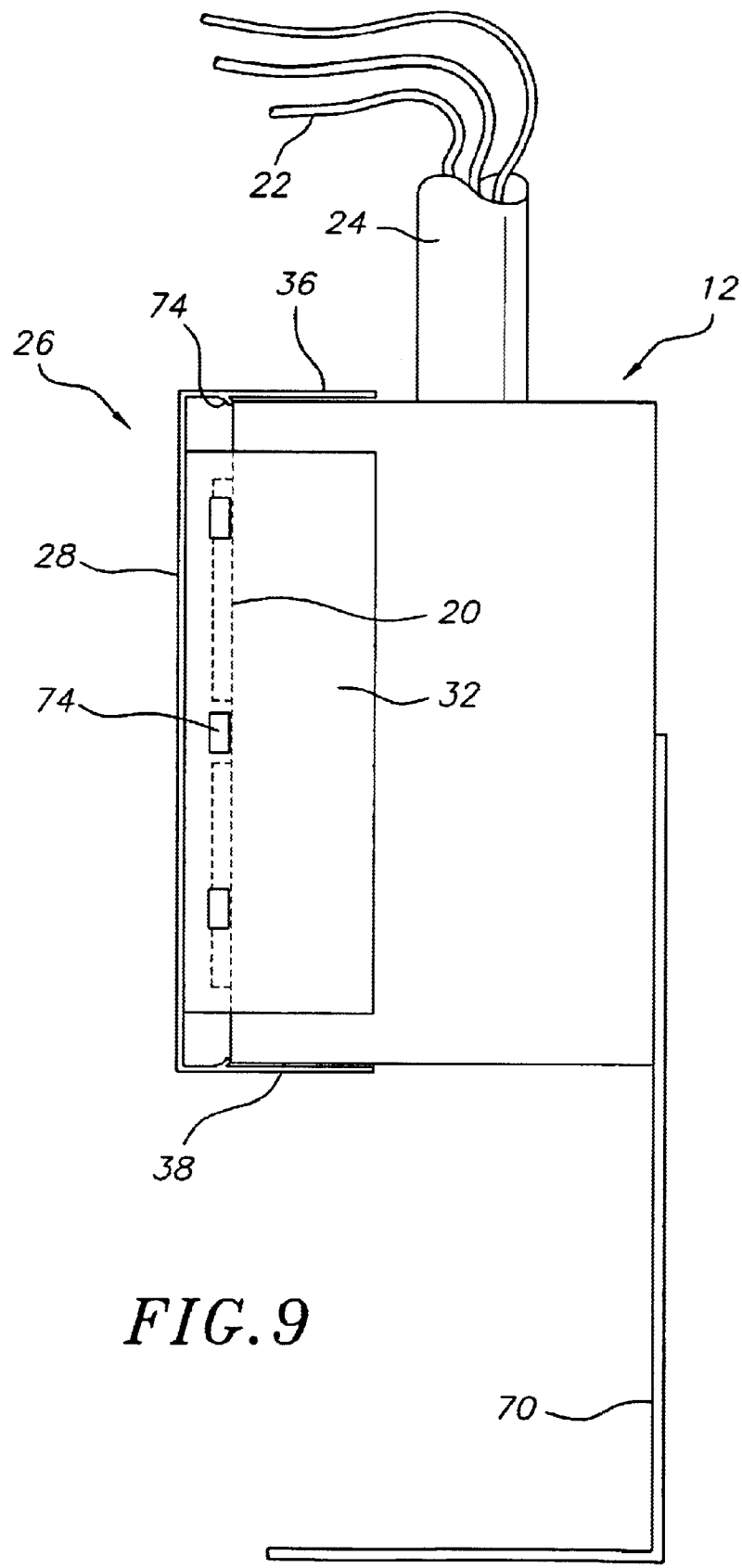
FIG. 9 is a side view of the outlet cover on an outlet box with bracket.

Referring to FIG. 1, there is shown a pre-wired outlet box which has a box 12, an interior portion 14, an opening 16 and an outer perimeter of the opening 18 as shown in FIG. 1, an electrical outlet 20 is shown attached inside of the outlet box and is wired with wiring 22. A conduit 24 is affixed to the outlet box 12 and has wires passing therethrough. As shown in FIG. 9, pre-wired outlet box 12 can have a bracket 76 attached thereto for attachment to steel studs and the like.

Figure 2:
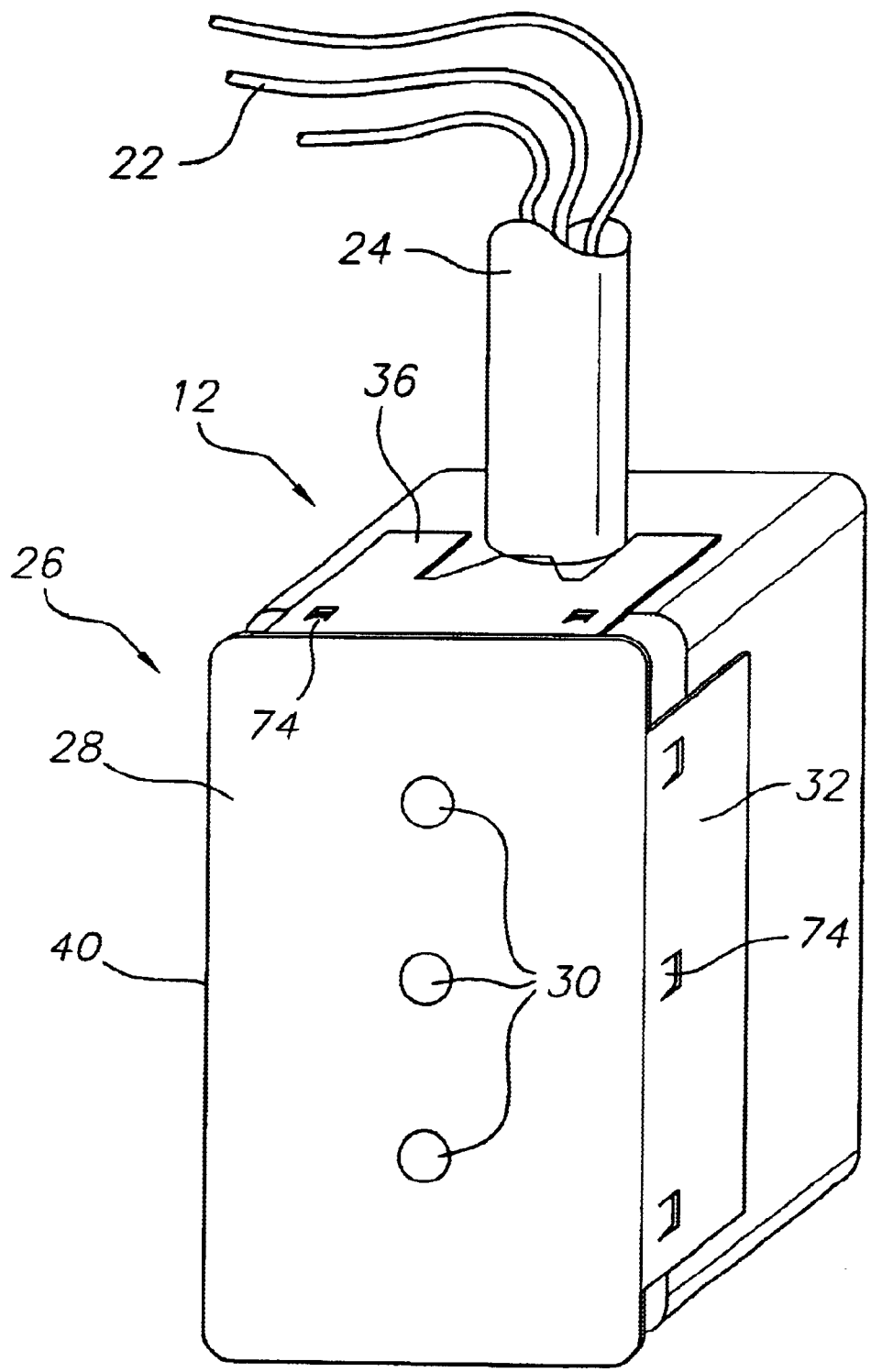
FIG. 2 is a perspective view of the cover and outlet box shown in FIG. 1 with the cover attached to the front of the outlet box.

A cover 26 for the pre-wired outlet box has a face portion 28, with removal means, such as apertures 30, formed therein. The apertures can be round or have other shapes. Extending from side edges of cover are arms 32 and 34 at a longer side of cover and side arms 36 and 38 at a shorter side of cover. Cover's dimensions and arms 32–38 are sized and dimensioned such that when cover is placed over opening 16 of outlet box 12, as shown in FIG. 2, side arms 32–38 tightly engage with outer surface 76 of walls of outlet box 12 and cover open front 16 of outlet box 12. Side arms 32 and 34, and 36 and 38 are preferably bent inwardly so as to exert frictional force on side walls of conduit box. Apertures 30 in outlet box are provided to allow tools, such as needlenose pliers, or a special tool to be inserted into apertures and pull cover 26 off of opening 16 of outlet box. Cover 26 preferably has a smooth perimeter 40 so as to permit a router to ride therearound. The cover is preferably formed of a material resilient to possible damage by a router, including material such as steel.

As best shown in FIGS. 2 and 9, when cover 26 is secured over opening 14 of an outlet box 12, the contents (e.g. outlets, wiring, etc.) in outlet box are protected from damage.

Figure 5:
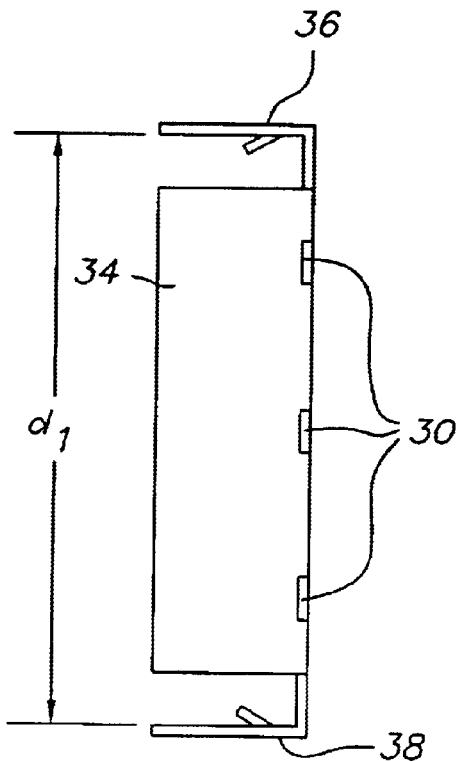
FIG. 5 is a side view of the outlet cover shown in FIG. 3.
Figure 3:
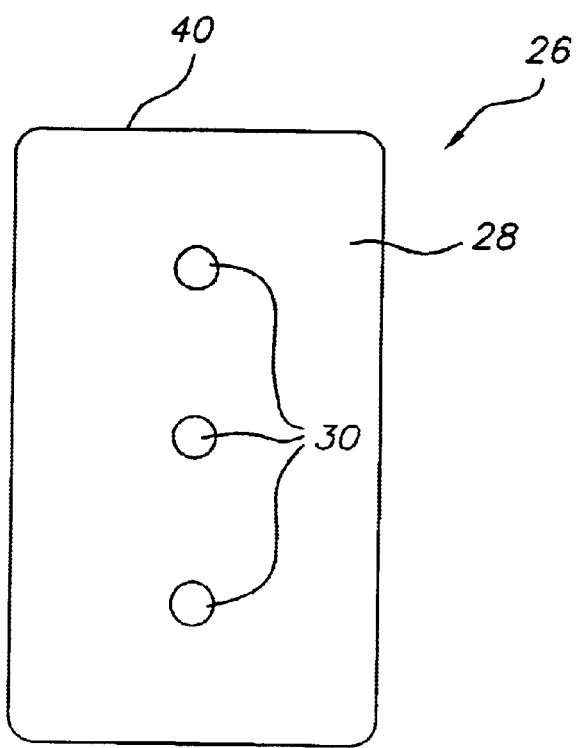
FIG. 3 is a top plain view showing the outlet cover of FIG. 1.
Figure 4:
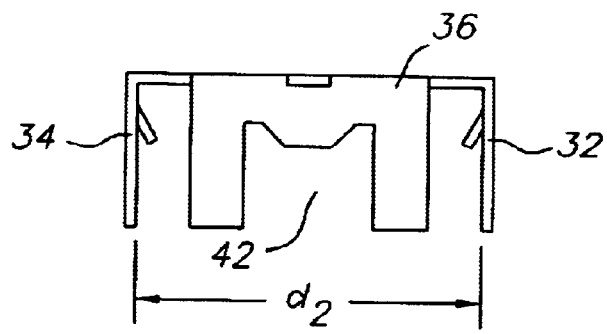
FIG. 4 is a bottom side view of the cover shown in FIG. 3.

Referring to FIGS. 3–5, there are shown additional views of outlet cover 26, with its face portion 28, and arms 30, 34, 36 and 38 extending from side edges 40 thereof. Outlet cover 26 is a single gang cover. The top and bottom sidearms 36 and 38 can have cutout portions 42 which have a size and shape adapted to clear obstructions such as conduit 24 (as shown in FIGS. 1, 2 and 9.) Referring to FIG. 5, sidearms 36 and 38 have an interior distance $D_1$ spacing and sidearms 32 and 34 have an interior spacing of $D_2$, wherein distances $D_1$ and $D_2$ are set to be slightly less than a longer outer dimension $X_1$ and $X_2$ of conduit box 12, (see FIG. 1), thereby establishing a tight frictional fit between the arms 32–38 and the outer side walls 76 of outlet box 12.

Referring to FIGS. 1–5 and 9, outlet cover 26 can optionally have tabs 74 formed on its side arms which tabs will prevent cover 26 from being pressed down all the way onto the front perimeter edge 18 of conduit box 12 and maintain a spacing between the flat plate 28 and the perimeter edge 18 of conduit box 12, thereby maintaining a spacing to prevent possible damage to a fixture such as an outlet 20 contained in the pre-wired conduit box. Tabs 74 can be formed by forming a generally rectangular notch stamped in the steel bending down the end of notch facing away from the plate thereby defining an edge which makes contact with a perimeter edge 18 of conduit box.

Figure 8:
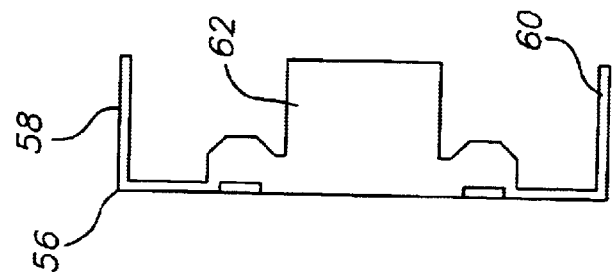
FIG. 8 is a bottom view of the outlet cover of FIG. 6.
Figure 6:
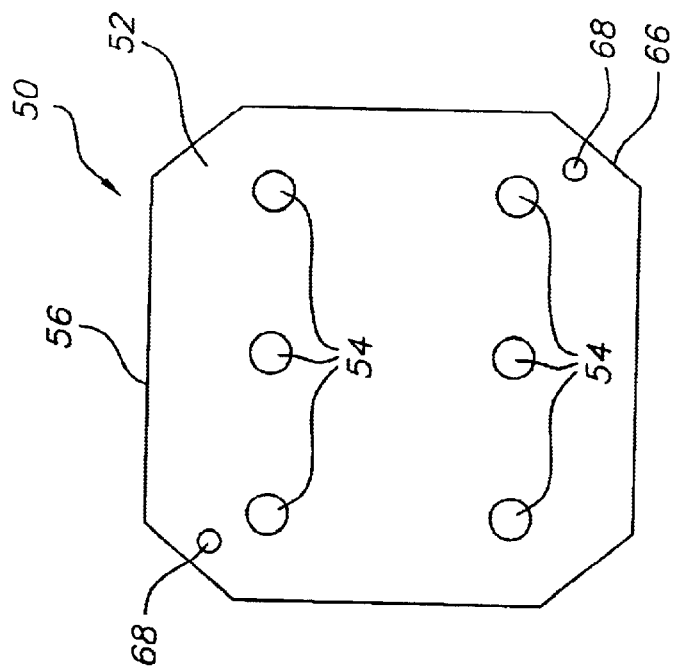
FIG. 6 is a top plan view of an outlet cover for a double gang outlet box.
Figure 7:
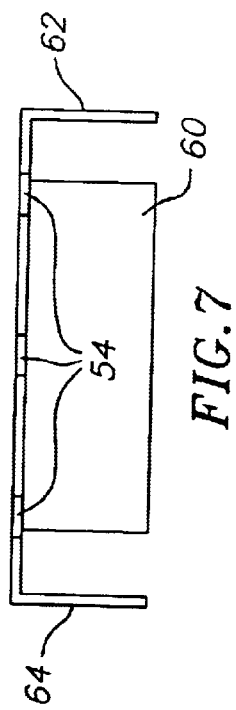
FIG. 7 is a side view of the outlet cover of FIG. 6.

Referring to FIGS. 6–8, there are shown views of a double gang type outlet box cover 50. Outlet box cover 50 has a front face 52 with a plurality of apertures 54 formed therein. From a perimeter side edges 56, opposing arms 58 and 60, and opposing arms 62 and 64 extend. As shown in FIG. 6, the corners 66 of the front face 52 do not have 90 degree corners, but are notched out. Depending on the application, a generally octagonal shaped cover plate can be used for octagonal shaped outlet boxes and likewise covers designed to cover round outlet boxes or other shapes can be provided. Additional apertures 68 can be formed on the front cover 52 for fixable attachment to an outlet box (e.g. by screws to the outlet box) if is desired to prevent the cover from being removed from the outlet box prior to complete installation of the sheet wall material.

Turning to FIG. 9, there is shown a side view of the conduit box 12 with outlet cover 26 fitted thereon of FIG. 2. As can be seen, the side arms 32, 34, 36 and 38 snugly engage the outside of the conduit box 12, and perimeter 40 provides a smooth perimeter upon which a router or other cutting tool can be smoothly guided.

A bracket 70 can be affixed to conduit box to permit secure placement of outlet at a predetermined position.

After pre-wired conduit box with cover is installed, and during the drywall or other wall covering installation process, cover 28/52 can be utilized to route out an opening for the outlet box and thereafter the outlet cover 26/52 can be removed by inserting needlenose pliers or other tools into apertures 30/54 and pull the outlet cover straight off of the outlet box.

Figure 10:
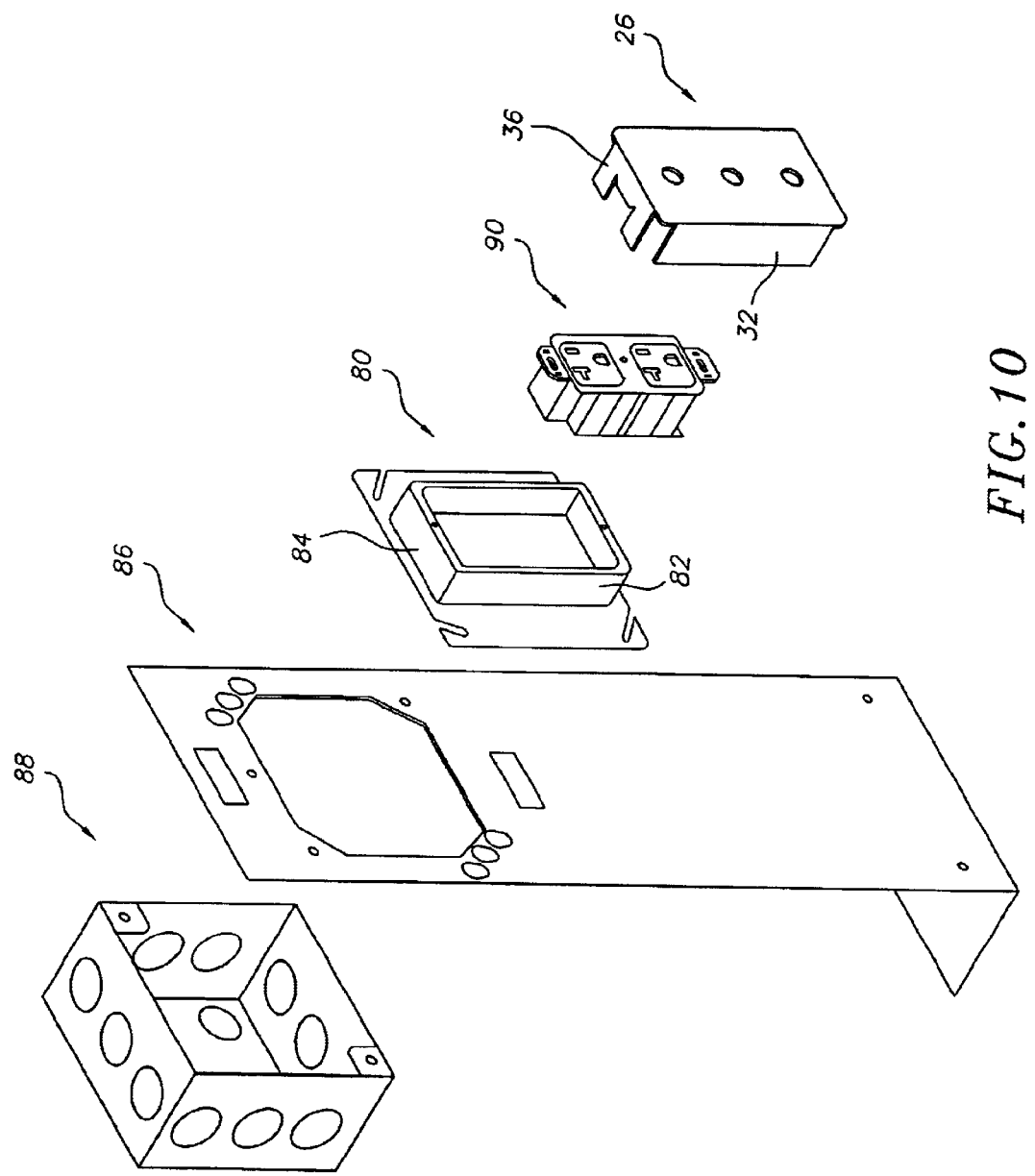
FIG. 10 is an exploded view shown another application of the invention wherein the outlet box cover is fitted to a mud ring for an outlet box.

FIG. 10 is an exploded view showing another application of the invention wherein the outlet box cover 26 shown in FIGS. 1–5 is adapted to be fitted over a mud ring 80, rather than directly onto side walls of an outlet box. Mud ring 80 has side walls 82 and 84 on which sidearms 32 and 36 of outlet box frictionally engage. Mud ring 80 attached to a bracket 86 which is attached to an outlet box 88. Mud ring 80 can, for example, be adapted to retain a decora type outlet 90, and mud rings are typically used to provide the proper flush orientation of outlets and switches relative to a finished wall surface.

Figure 11:
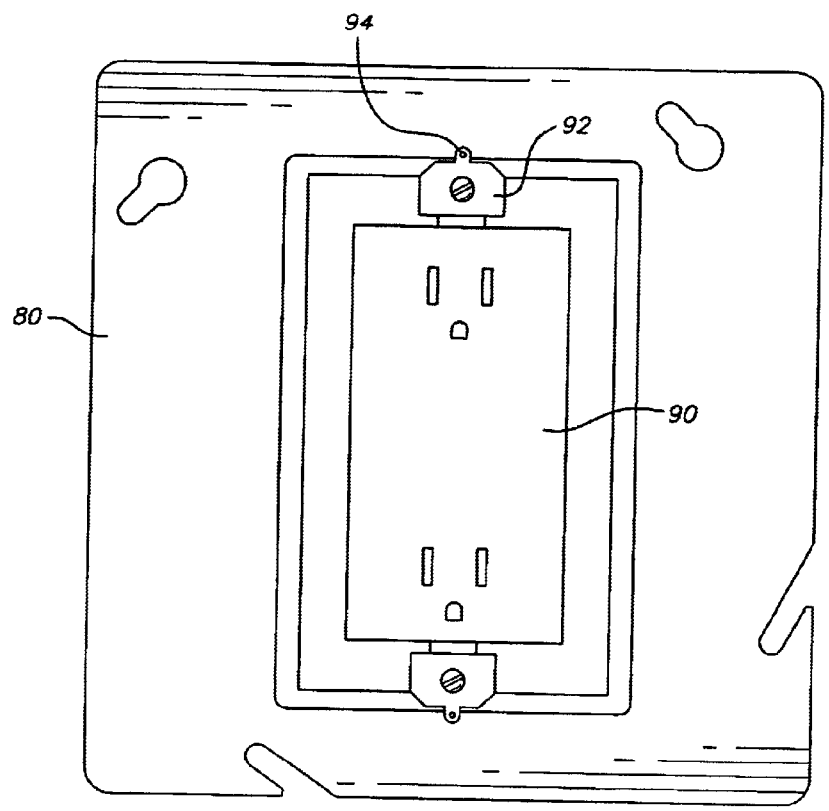
FIG. 11 is a top plan view of a decora type outlet mounted to a mud ring.

FIG. 11 is a top plan view of a decora type outlet 90 mounted to the mud ring 80 shown in FIG. 10. In its mounted position, outlet 90 has two retention tabs 92 with threaded holes 94 to mount an outlet cover (not shown) to the decora outlet for finished installation. It is important to protect these retention tabs 92 from damage.

Figure 12:
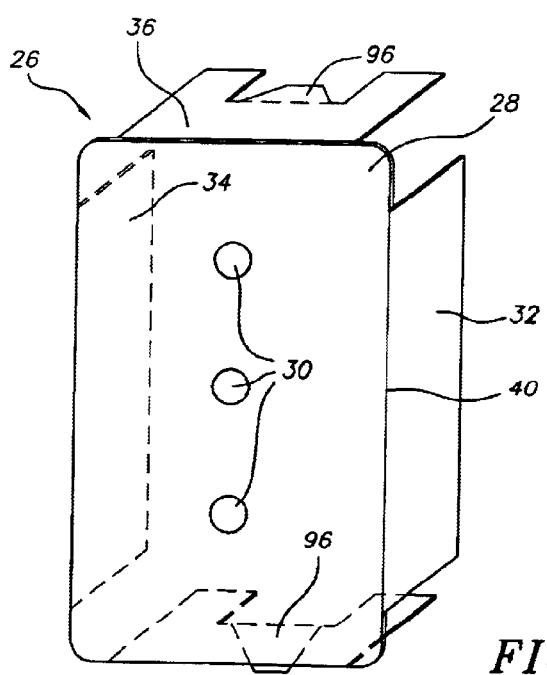
FIG. 12 is a perspective view showing an outlet cover with its tabs bent out to protect the threaded openings of the decora type outlet.

FIGS. 12–14 show an outlet cover 26 with its tabs 96 bent out to protect the threaded openings of the decora type outlet.

Figure 15:
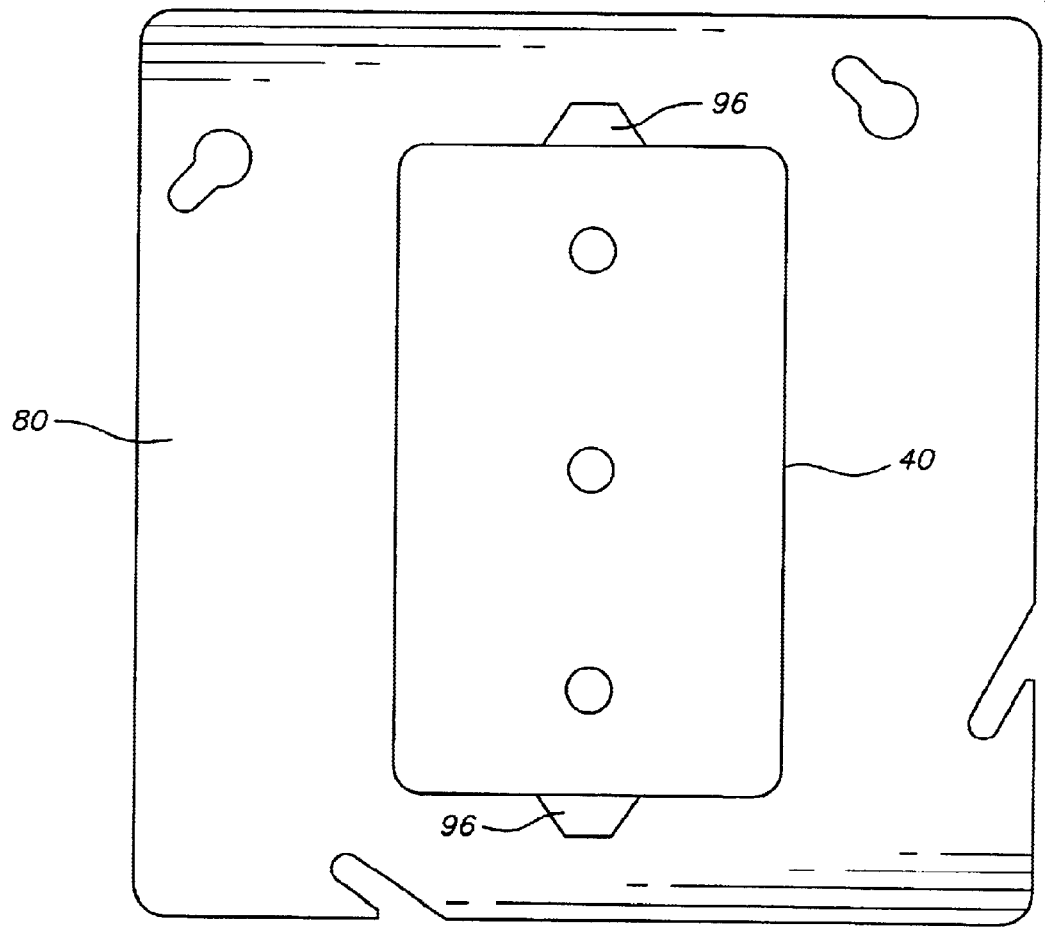
FIG. 15 is a top plan view showing the outlet cover of FIG. 12 mounted to protect the decora type outlet mounted thereto.

Turning now to FIG. 15, there is shown a top plan view showing the outlet cover 26 of FIG. 12 mounted to cover the front of docora outlet 90 and its retention tabs 92 (covered and not shown). As can be seen, bent out tabs 96 protect the retention tabs 92, but do not impede a router from cutting around the perimeter 40 of cover 26. The bent out tabs 96 further seat on retention tabs 92 and prevent cover 26 from being pushed down and damaging outlet 90.

The outlet cover will preferably come as part of the pre-wired outlet system having a pre-wired conduit box with wiring and fixtures located therein and with mounting means, with the outlet cover fitted over the outlet box and will not only serve to protect the wiring and outlet and/or switches, during wall sheet installation, painting, wallpapering, other wall treatments, but also during storage and transportation of the pre-wired boxes, and the like.

Although apertures 30 and 54 shown in the faces of the covers are shown as circular holes, other shapes can be utilized such as long slot shaped apertures, rectangular holes and other shapes. Furthermore, although the plurality of apertures are shown, a single aperture could also be provided. The outlet covers are preferably made from a single piece of sheet steel bent to shape, but could also be made from multiple pieces of material permanently fixed (e.g. by spot welding) together.

Having thus described exemplary embodiments of the present invention, it should be understood by those skilled in the art that the above disclosures exemplary only and that various other alternatives, adaptations and modifications may be made within the scope of the present invention. The presently disclosed embodiments are to be considered in all respects as illustrative and not restrictive. The scope of the invention being indicated by the claims, rather than the foregoing description, and all changes which come within the meaning and range of equivalency of the claims are therefore intended to be embraced therein.

A plurality of outlet covers having a single pair of opposing arms can be provided and stacked adjacent to one another in order to provide a simple means to cover extra wide outlet boxes (e.g. triple or greater width outlet boxes) without requiring the manufacturer of a wide range of outlet covers (not shown). In addition to having outlet switches, jacks with wiring, the outlet box could also be an outlet for pressurized gases for vacuum, computer data lines, VCR, and the like, all of which are best protected.

What is claimed is:

1. A cover for conduit boxes for use in installing sheet wall material around a pre-wired conduit boxes, the conduit boxes having a front opening and spaced apart side walls and a back wall that define a cavity therein, the cover comprising;
   a face plate which is sized to cover said front opening of the conduit box, the face plate having a perimeter edge and having removal means formed thereon, the face plate being formed of puncture and ablation resistant material; and
   at least one pair of opposing side arms that extend outwardly from the face plate, the at least two opposing side arms being spaced apart by a distance that is adapted to tightly engage the side walls of the conduit box, the at least one pair of opposing side arms having bent out tabs formed on the side arms to prevent the face plate from being forced down to a fixture, wherein the perimeter edge of the face plate provides a tool guiding edge, and wherein the at least one pair of side arms have cutouts formed therethrough with the cutouts having a size and shape to clear obstructions such as a conduit when the cover is attached to one of said conduit boxes.

2. The cover of claim 1, wherein the removal means comprises at least one aperture formed through the face plate.

3. The cover of claim 1, wherein the cover is formed from a single piece of stamped steel and the at least one pair of side arms are bent downwardly from the plane of the face plate.

4. The cover of claim 1, wherein there are two pairs of opposing side arms.

5. The cover of claim 1, wherein the cover is formed from a single piece of stamped steel and the at least one pair of side arms are bent downwardly and slightly inwardly to each other to exert frictional side forces so as to prevent the cover from being inadvertently removed from the conduit box absent an outward pulling force.

6. The cover of claim 1, further comprising mounting apertures for fixedly mounting the cover to the conduit box with screws.

7. The cover of claim 1, wherein the conduit box is prewired and contains the fixture therein.

8. A cover for pre-wired conduit boxes for use in installing sheet wall material around a pre-wired conduit boxes, the pre-wired conduit boxes having a front opening and spaced apart side walls which define a cavity therein, the cover comprising:
a face plate which is sized to cover said front opening of the conduit box, the face plate having an outer perimeter edge and having a plurality of apertures formed therethrough, said apertures are being adapted for engagement with a removal tool; and
two pairs of opposing side arms that are unitary with the face plate and which extend outwardly from the face plate, the two pairs of opposing side arms being generally parallel to one another and being spaced apart by a distance that is adapted to tightly engage the side walls of the conduit box, the two pairs of opposing side arms having a bent out tabs formed thereon to prevent the face plate from being forced down the a fixture, wherein the cover is formed from stamped steel and the perimeter edge of the cover provides a tool guiding edge, and wherein at least one pair of said two pairs of opposing side arms have cutouts formed therethrough with the cutouts having a size and shape to clear obstructions such as a conduit when the cover is attached to one of said conduit boxes.

9. The cover of claim 8, further comprising mounting apertures for fixedly mounting the cover to the front opening of the conduit box with screws.

10. A pre-wired conduit system adapted for ease of installation within walls, comprising:
a pre-wired conduit box having a front opening and spaced apart side walls and a back wall that define a cavity therein, the conduit box having a fixture and wiring located therein;
a mud ring fitted over the conduit box, the mud ring having an opening, extension walls, and a plate portion, with the fixture affixed in the opening;
a conduit with wiring therein connected to the pre-wired conduit box; and
a cover comprising a face plate which is sized to cover the opening of the mud ring and the fixture fixed thereto, the face plate having a perimeter edge, the face plate being formed of puncture and ablation resistant material, and at least one pair of opposing side arms that extend rearwardly from the face plate, the at least one pair of opposing side arms having bent out tabs formed thereon which seat on retention tabs of the fixture to prevent the face plate from being forced down to the fixture when said cover is attached to said conduit box, and wherein the perimeter edge of the cover provides a tool guiding edge.

11. The pre-wired conduit system of claim 10, further comprising removal means comprises at least one aperture formed through the face plate.

12. The pre-wired conduit system of claim 10, wherein the cover is formed from a single piece of stamped steel and the at least one pair of opposing side arms are bent rearwardly from the plane of the face plate.

13. The pre-wired conduit system of claim 10, wherein the cover has two pairs of opposing side arms, and one pair of said two pairs of opposing side arms has bent out tabs.

14. The pre-wired conduit system of claim 10, wherein the cover is formed from a single piece of stamped steel and the at least one pair of side arms are bent rearwardly arid slightly inwardly to each other to exert frictional side forces so as to prevent the cover from being inadvertently removed from the mud ring absent an outward pulling force.

15. A cover for conduit boxes for use in installing sheet wall material around conduit boxes with a mud ring, the mud ring having a front opening and spaced apart side walls, the cover comprising:
a face plate which is sized to cover said front opening of the mud ring, the face plate having a perimeter edge and, the face plate being formed of puncture and ablation resistant material; and
at least one pair of opposing side arms that extend outwardly from the face plate, the side arms having bent out tabs formed thereon which seat on retention tabs of a fixture to prevent the face plate from being forced down to the fixture when said cover is attached to said conduit box, and wherein the perimeter edge of the face plate provides a tool guiding edge.

16. The cover of claim 15, further comprising at least one aperture formed through the face plate.

17. The cover of claim 15, wherein the cover is formed from a single piece of stamped steel and the at least one pair of side arms are bent downwardly from the plane of the face plate.

18. The cover of claim 15, wherein there are two pairs of opposing side arms.

19. The cover of claim 15, wherein the cover is formed from a single piece of stamped steel and the at least one pair of side arms are bent downwardly and slightly inwardly to each other to exert frictional side forces so as to prevent the cover from being inadvertently removed from the mud ring absent an outward pulling force.

20. The cover of claim 15, further comprising mounting apertures for fixedly mounting the cover to the mud ring with screws.

* * * * *